(12) United States Patent
Atsuchi et al.

(10) Patent No.: US 8,746,391 B2
(45) Date of Patent: Jun. 10, 2014

(54) ELECTRIC VEHICLE

(75) Inventors: Michio Atsuchi, Wako (JP); Junji Kikuno, Wako (JP); Takashi Inoue, Wako (JP); Masayuki Kinoshita, Wako (JP); Kasetwetin Tawatchai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 139 days.

(21) Appl. No.: 13/282,466

(22) Filed: Oct. 27, 2011

(65) Prior Publication Data

US 2012/0103710 A1    May 3, 2012

(30) Foreign Application Priority Data

Oct. 29, 2010  (JP) .................................. 2010-243977

(51) Int. Cl.
*B62K 11/00*    (2006.01)

(52) U.S. Cl.
USPC .......................... 180/220; 180/68.5; 180/311

(58) Field of Classification Search
USPC ............... 180/65.1, 220, 216, 312, 311, 68.5, 180/65.31
See application file for complete search history.

(56) References Cited

U.S. PATENT DOCUMENTS

| | | | | |
|---|---|---|---|---|
| 3,779,597 A | * | 12/1973 | Uchida ....................... | 296/37.15 |
| 3,934,669 A | * | 1/1976 | Adams .......................... | 180/208 |
| 4,522,442 A | * | 6/1985 | Takenaka ..................... | 296/37.1 |
| 4,666,009 A | * | 5/1987 | Yashima et al. ............. | 180/68.5 |
| 4,915,188 A | * | 4/1990 | Ota et al. ....................... | 180/219 |
| 5,303,795 A | * | 4/1994 | Buell ............................ | 180/219 |
| 5,433,286 A | * | 7/1995 | Kumamaru et al. .......... | 180/219 |
| 6,047,786 A | * | 4/2000 | Stevenson et al. ........... | 180/65.1 |
| 6,318,743 B1 | * | 11/2001 | Nakashima et al. ....... | 280/152.1 |
| 6,324,464 B1 | * | 11/2001 | Lee et al. ......................... | 701/93 |
| 6,357,542 B1 | * | 3/2002 | Sako ............................. | 180/68.5 |
| 7,140,458 B2 | * | 11/2006 | Nakagawa et al. .......... | 180/65.1 |
| 7,255,191 B2 | * | 8/2007 | Baldwin et al. ............... | 180/220 |
| 7,267,190 B2 | * | 9/2007 | Hirano ......................... | 180/65.1 |
| 7,594,558 B2 | * | 9/2009 | Isayama ....................... | 180/219 |
| 2012/0197470 A1 | * | 8/2012 | Inui ................................. | 701/22 |
| 2013/0161108 A1 | * | 6/2013 | Watanabe et al. ............. | 180/220 |

FOREIGN PATENT DOCUMENTS

| | | |
|---|---|---|
| CN | 1412067 | 4/2003 |
| CN | 2559541 Y | 7/2003 |
| CN | 201323716 Y | 10/2009 |
| JP | 05-105160 | 4/1993 |

OTHER PUBLICATIONS

Chinese Office Action for corresponding CN Application No. 201110334772.5, Sep. 29, 2013.

* cited by examiner

*Primary Examiner* — Katy M Ebner
*Assistant Examiner* — Emma K Frick
(74) *Attorney, Agent, or Firm* — Ditthavong Mori & Steiner, P.C.

(57) ABSTRACT

An electric vehicle includes a vehicle body frame, a seat, a driving wheel, a motor, a battery, an accessory, and an accessory box. The vehicle body frame includes a head pipe, a main frame connected to the head pipe, and a first seat frame attached to the main frame. The seat is fixed to an upper portion of the first seat frame. The driving wheel is rotatable relative to the vehicle body frame. The motor is connected to the driving wheel to rotate the driving wheel. The battery is configured to supply power to the motor. The accessory is configured to assist at least one of the motor and the battery. The accessory box stores the battery and the accessory. The accessory box is provided above a rear end of the main frame and under the seat.

13 Claims, 9 Drawing Sheets

ELECTRIC VEHICLE

CROSS-REFERENCE TO RELATED APPLICATIONS

The present application claims priority under 35 U.S.C. §119 to Japanese Patent Application No. 2010-243977, filed Oct. 29, 2010. The contents of this application are incorporated herein by reference in their entirety.

BACKGROUND OF THE INVENTION

1. Field of the Invention

The present invention relates to an electric vehicle.

2. Discussion of the Background

An electric vehicle that is not of a scooter type but includes a straddle portion is known. The electric vehicles of this kind are vehicles designed to be driven by a motor, and a battery, as a source of a travel driving force for driving an electric motor, is placed in the straddle portion (see Patent Japanese Patent Application Publication No. H05-105160).

SUMMARY OF THE INVENTION

According to one aspect of the present invention, an electric vehicle comprises a vehicle body frame, a seat, a driving wheel, a motor, a battery, an accessory, and an accessory box. The vehicle body frame comprises a head pipe, a main frame connected to the head pipe and extending rearward downward from the head pipe, and a first seat frame attached to the main frame and extending rearward upward from the main frame. The seat is fixed to an upper portion of the first seat frame. The driving wheel is rotatable relative to the vehicle body frame. The motor is connected to the driving wheel to rotate the driving wheel. The battery is configured to supply power to the motor. The accessory is configured to assist at least one of the motor and the battery. The accessory box stores the battery and the accessory. The accessory box is provided above a rear end of the main frame and under the seat.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
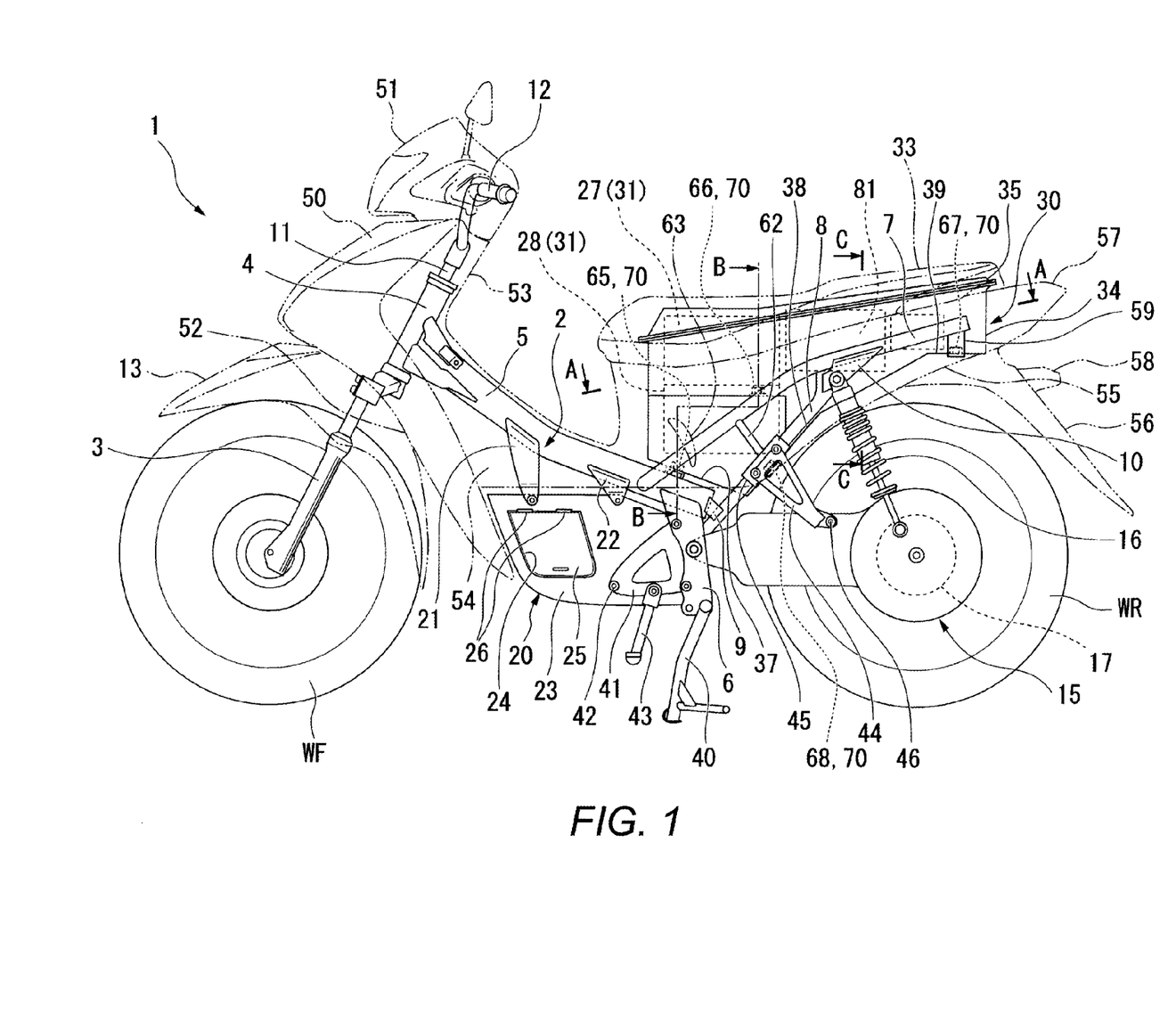
FIG. 1 is a side view of an electric motorcycle of an embodiment of the present invention.

As shown in FIG. 1, an electric three-wheel vehicle 1 as an electric vehicle is a battery-driven electric vehicle, and includes a vehicle body frame 2.

The vehicle body frame 2 includes: a head pipe 4 configured to rotatably supporting front forks 3 with the assistance of a steering shaft (not illustrated); a unitary main frame 5 joined to the head pipe 4, and extending rearward downward in the middle portion of the main frame 5 in the vehicle widthwise direction; a pair of left and right pivot plates 6, 6 joined to the rear-end lower portion of the main frame 5, and extending downward; a pair of left and right seat frames 7, 7, fixing portions in their respective front end portions being connected to the rear portion of the main frame 5, the left and right seat frames 7, 7 extending rearward upward; and rear sub-frames 8, 8 connected to the rear end portion of the main frame 5, extending rearward and upward, and their rear ends connected to the respective seat frames 7, 7. In this respect, the front end portions of the rear sub-frames 8 are joined to the rear portions of the pivot plates 6 and the rear end portion of the main frame 5 with the assistance of brackets 9, respectively. The rear end portions of the rear sub-frames 8 are joined to portions of the seat frames 7, which are slightly closer to the rear ends of the seat frames 7 beyond the center portions of the seat frames 7, with the assistance of joining brackets 10.

A front wheel WF is pivotally supported by the lowermost end portions of the front forks 3. A handlebar 12 is attached to the uppermost end of the steering shaft supporting the front forks 3 with the assistance of a handlebar post 11. In addition, a front fender 13 covering the upper portion of the front wheel WF is attached to the front forks 3.

A swing unit 15 pivotally supporting a rear wheel WR is supported by the pivot plates 6, 6 in a way that makes the swing unit 15 capable of swinging in the vertical direction. Rear cushions 16 are provided between the joining brackets 10 of the rear sub-frames 8 and the rear end portions of the swing unit 15, respectively. An in-wheel three-phase AC travel drive motor 17 is installed in the rear portion of the swing unit 15. This motor 17 is linked to the rear wheel WR as the driving wheel.

A storage box 20 is placed under the main frame 5. This storage box 20 is supported by two front hanger brackets 21 and two rear hanger brackets 22 provided to the respective lateral walls of the main frame 5, as well as by the front portions of the respective pivot plates 6. In the case of a regular engine-driven vehicle, its engine is placed in this location. In contrast, however, this location is secured for the storage space through the effective use of the location. An opening portion 24 is formed in each lateral wall portion 23 of the storage box 20. A lid 25 is attached to the opening portion 24 in a way that a hinge 26 makes the lid 25 capable of opening and closing. Incidentally, the shape of the storage box 20, the opening and closing direction of the lid 25, as well as the how the lid 25 opens and closes are shown as their examples, but not limited to what have been described here.

A case-shaped accessory box 30 is placed above the rear wheel WR. A battery 31 for driving the motor 17, accessories provided for the battery 31 to drive the motor 17, and a 12-volt auxiliary battery 32 are stored in the accessory box 30. A tandem-type seat 33 is fixed to the top portion of the accessory box 30. In this respect, the seat 33 is not of a type which is opened and closed by manipulating a key, or the like, and the seat 33 is fixedly attached to the accessory box 30 and the seat frames 7.

In short, the seat 33 has a structure which does not allow the rider to detach the seat 33, and which enables the seat 33 to be detached only during a maintenance service. The accessory box 30 is placed in a space portion situated above the rear end of the main frame 5 and under the seat 33.

In this respect, the accessory box 30 is formed from a box main body 34 and a lid 35 for closing the upper portion of the box main body 34. The lid 35 is fixed to the box main body 34 by use of bolts 36 (see FIG. 4).

A main stand 40 is supported by the lower ends of the respective pivot plates 6, 6. For example, triangular frame-shaped front step brackets 41 are attached to the front edge portions of the pivot plates 6, and front steps 42 are supported by the front end portions of the front step brackets 41, respectively. A side stand 43 is supported by the lower portion of the left front step bracket 41. In addition, triangular frame-shaped rear step brackets 44 are fixed to the rear sub-frames 8 by use of brackets 45, and rear steps 46 are attached to the lower ends of the rear step brackets 44, respectively.

The head pipe 4 is covered with a front cover 50, and a meter cover 51 is provided above the front cover 50. Leg shields 52 are connected to the left and right of the front cover 50, respectively. An inner cover 53 is provided corresponding to the front cover 50 from the rear. Side covers 54 are provided to the two lateral portions of the inner cover 53. Rear side covers 55 are continuingly provided to the respective side covers 54. A rear fender 56 is supported by the rear side covers 55. A tail lamp 58 is provided to the rear fender 56. Louvers 63 are provided to the side covers 54 in a way that the louvers 63 are opened in the side covers 54, respectively. Incidentally, reference numeral 57 denotes a tail cover.

Figure 2:
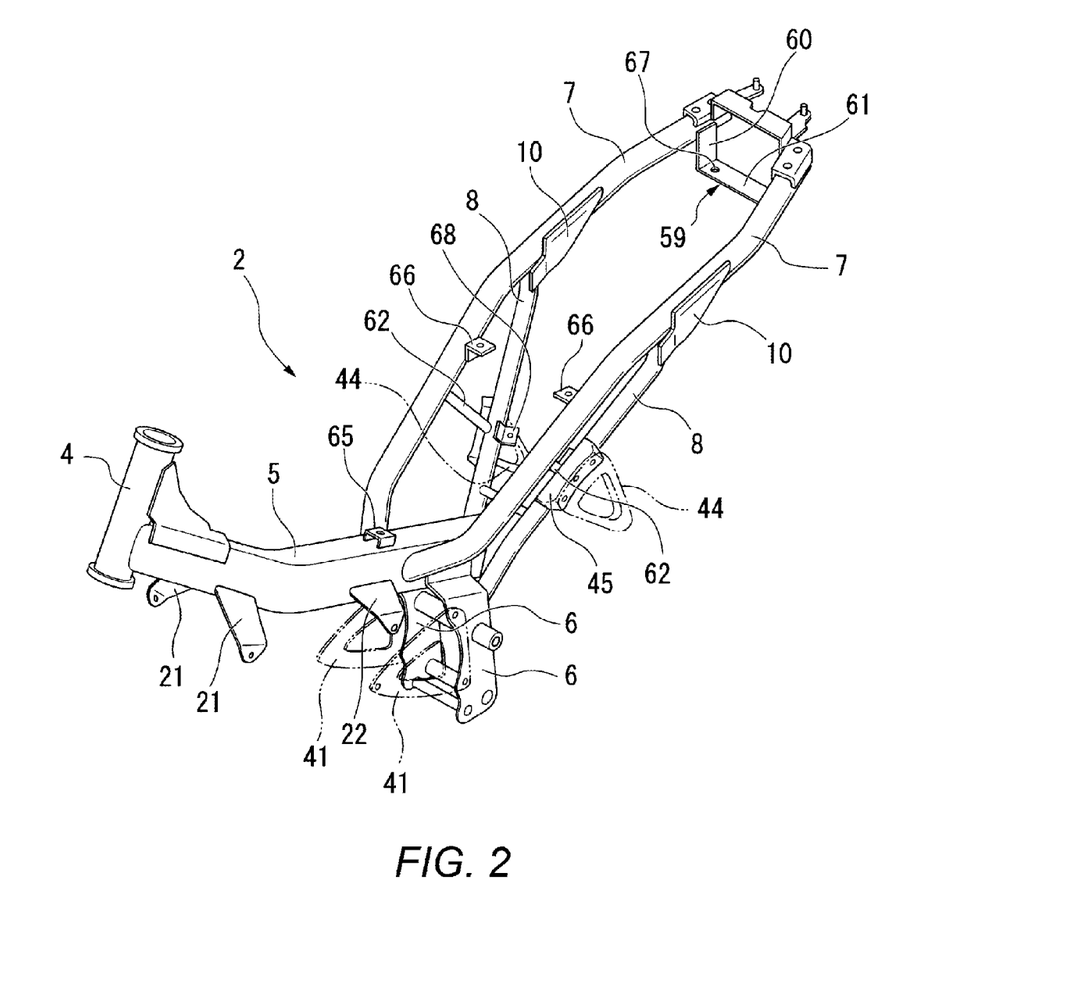
FIG. 2 is a perspective view of a vehicle body frame.
Figure 4:
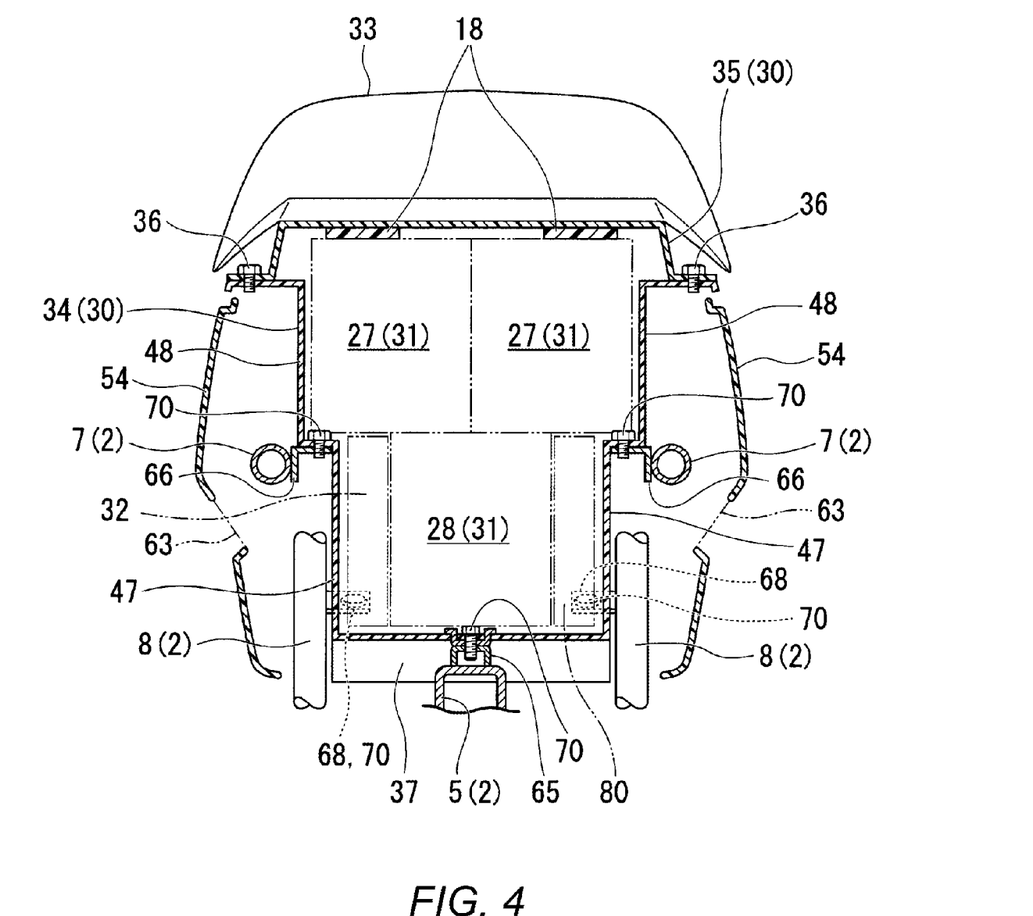
FIG. 4 is a cross-sectional view taken along the B-B line of FIG. 1.

As shown in FIG. 2, the main frame 5 is a member which is provided in the center portion in the vehicle widthwise direction, and whose cross section is shaped like a square cap opened downward (see FIG. 4). The pair of left and right seat frames 7, 7 joined to the main frame 5 are pipe-shaped members. The bases of the seat frames 7, 7 are fixed to the side walls of the main frame 5, respectively. When viewed in a plan view, the seat frames 7, 7 are spaced out progressively wider toward the rear, and the rear end portions of the respective seat frames 7, 7 are subsequently connected to each other by use of a cross plate 59 provided in the vehicle widthwise direction. The cross plate 59 is a member having two side walls 60, 60 and a bottom wall 61, as well as is thus shaped like the letter U. The upper end portions of the cross plate 59 are joined to the inner surfaces of the seat frames 7, respectively.

The cross plate 59 supports the rear end portion of the accessory box 30 placed inside a space interposed between the seat frames 7, 7. Reinforcement frames 62 are connected between the brackets 45 of the rear step brackets 44 and the seat frames 7 in the center portions of the rear sub-frames 8 in the front-rear direction, respectively. The side surfaces of the accessory box 30 are covered with the seat frames 7, the rear sub-frames 8 and the reinforcement frames 62, respectively (see FIG. 1).

In this respect, a front attachment seat 65 for the accessory box 30 is provided in the center portion of the main frame 5 in the front-rear direction. The front attachment seat 65 is set up in a location which overlaps the bases of the seat frames 7 when viewed in a side view. In addition, intermediate attachment seats 66 for the accessory box 30 are inwardly attached to portions of the seat frames 7, which are situated slightly in the rear of other portions of the seat frames 7 to which the reinforcement frames 62 are attached, respectively. The intermediate attachment seats 66 are similarly set up in locations which overlap the seat frames 7 when viewed in the side view, respectively.

Rear attachment seats 67, 67 for the accessory box 30 are provided to two lateral portions of the bottom wall 61 of the cross plate 59 attached to the rear ends of the seat frames 7, respectively. The accessory box 30 is fastened and fixed to the front attachment seat 65, the intermediate attachment seats 66, 66 and the rear attachment seats 67, 67 by use of bolts 70 (see FIG. 4).

In addition, lower attachment seats 68 for the accessory box 30 are also provided to portions of the rear sub-frames 8, which are slightly in the rear of the reinforcement frames 62, respectively. The lower attachment seats 68 are similarly fixed to locations which overlap the rear sub-frames 8 when viewed in the side view. The accessory box 30 is fastened and fixed to the lower attachment seats 68 by use of bolts 70, respectively.

As shown in FIG. 1, a rear-descending inclination wall 37 which becomes lower toward the rear along the main frame 5 is formed in the front portion of the bottom wall of the accessory box 30. After that, the accessory box 30 has a rear-ascending inclination wall 38 which is directed obliquely upward toward the rear along the rear sub-frames 8. Finally, the accessory box 30 has a horizontal surface 39 in its rear portion.

Figure 3:
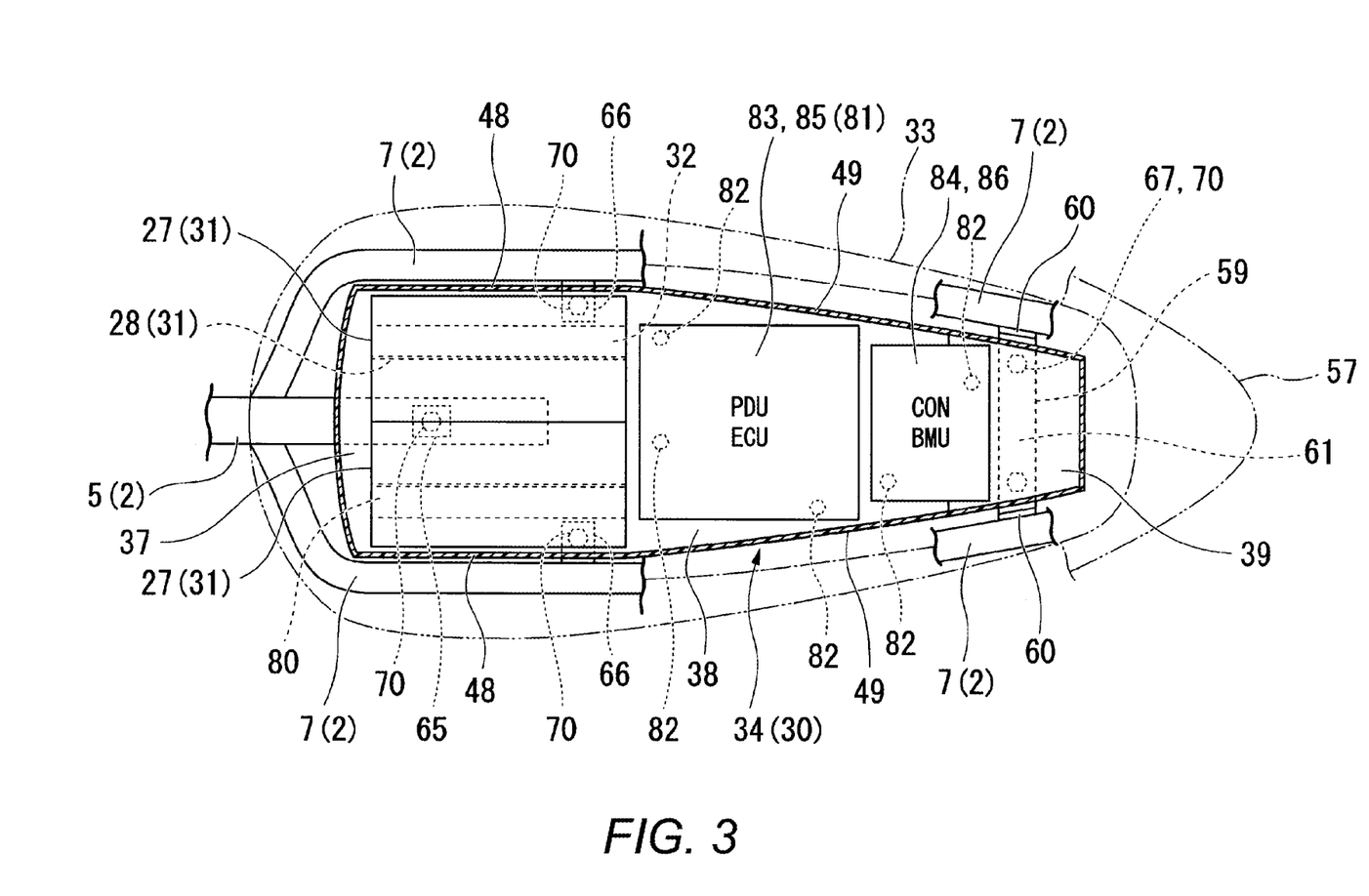
FIG. 3 is a cross-sectional view taken along the A-A line of FIG. 1.
Figure 5:
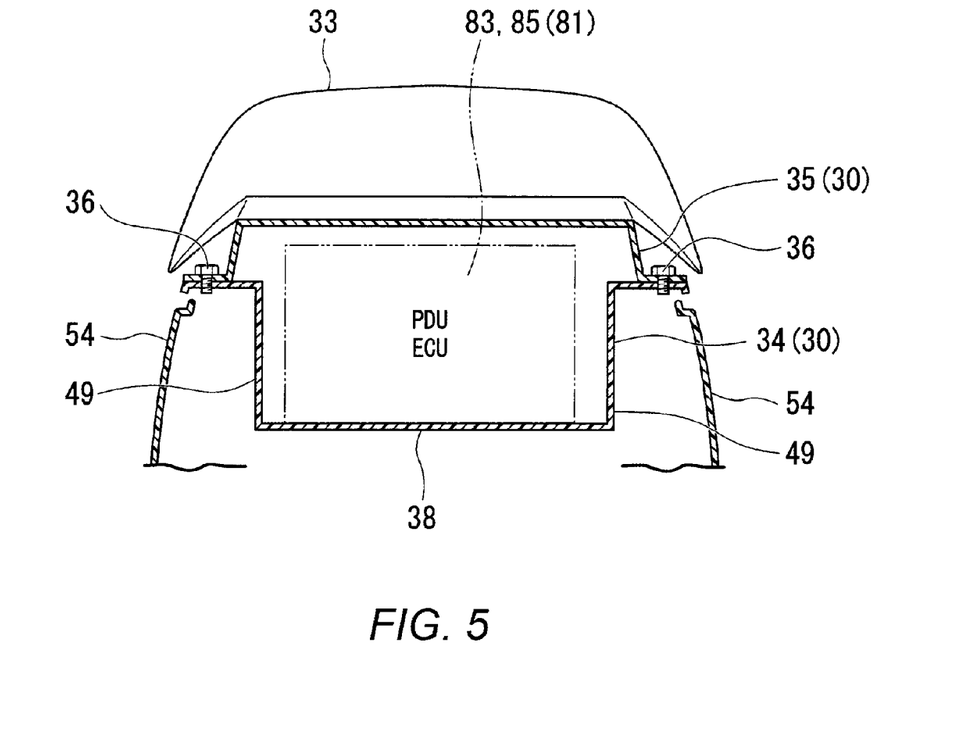
FIG. 5 is a cross-sectional view taken along the C-C line of FIG. 1.

With regard to the side walls of the accessory box 30, as shown in FIGS. 3 to 5, the distance between front upper side walls 48 is wider than any other distance between the corresponding side walls, and is constant. Front lower side walls 47 are formed in a way that the distance between the front lower side walls 47 is narrower than the distance between the upper side walls 48, and the narrower distance constitutes steps. Rear side walls 49 of the accessory box 30 are continued to the respective the upper side walls 48, and are formed in a way that makes the distance between rear side walls 49 of the accessory 30 gradually narrower toward rear.

The battery 31 of a lithium ion-type configured to function as a source of a driving force for the motor 17 is stored in the front portion of the accessory box 30. The battery 31 includes a pair of left and right upper batteries 27, 27 and a single lower battery 28 which are connected together in series. The pair of left and right upper batteries 27, 27 are placed in accordance with the shape in which the seat frames 7, 7 are spaced out wider. The single lower battery 28 is placed under the upper batteries 27, 27, and in the center portion in the vehicle width.

In other words, the battery 31 is placed in a way that makes the width of the upper tier of the battery 31 wider than the width of the lower tier of the battery 31. Each of the upper batteries 27, 27 and the lower battery 28 are formed from multiple battery cells connected together in series. The upper batteries 27, 27 and the lower battery 28, which are connected together in series, produce 48 volts to 72 volts in total, for example. The battery 31 is charged by an electric power supplied through a charger connector 71, which will be described later. Incidentally, the external forms of the respective upper batteries 27, 27 and the external form of the lower battery 28 are shown by chain lines. A cushioning material 18 is interposed between the upper portions of the respective upper batteries 27 and the lid 35.

The auxiliary battery 32 is placed in the right one of the two flanks of the lower battery 28, and a DC-DC converter 80 is placed in the left one of the two flanks of the lower battery 28. The DC-DC converter (DC-DC) 80 is configured to charge the auxiliary battery 32 by lowering the voltage of the battery 31. The auxiliary battery 32 is configured to supply a voltage to the 12-voltage accessories and control device.

A control unit 81 is placed in the rear of the battery 31 in the accessory box 30, and is fixed to the rear-ascending inclination wall 38 of the accessory box 30 by use of fixing bolts 82 directly or with the assistance of the corresponding brackets, which are not illustrated. The control unit 81 is that obtained by unitarily connecting a power drive unit (PDU) 83 and an ECU 85 together. The power drive unit 83 is a switching unit (driver) configured to drive the motor 17. The ECU 85 is configured to control a battery managing unit (BMU) 84 and a power drive unit 83, which will be described later.

An accelerator opening signal from an accelerator grip provided to the handlebar 12 is inputted into the ECU 85. On the basis of this accelerator opening signal, the battery managing unit 84 and the power drive unit 83 are controlled by the ECU 85. Incidentally, the ECU 85 receives not only the accelerator opening signal but also signals from various sensors, and outputs control signals to the various accessories.

A contactor (CON) 86 and the battery managing unit 84, which are integrated into a unit, are placed in the rear of the control unit 81 in the accessory unit 30, and are fixed to the accessory box 30 by use of bolts 82 directly or with the assistance of the brackets, which are not illustrated. The contactor 86 is configured to turn on and off a drive circuit of the motor 17. The battery managing unit 84 is configured to control the charge and discharge of the battery 31. The accessories include the auxiliary battery 32, the DC-DC converter 80, the power drive unit 83, the ECU 85, the contactor 86 and the battery managing unit 84.

Figure 6:
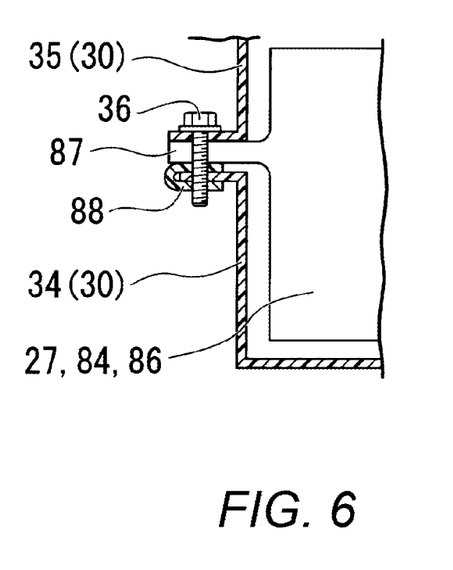
FIG. 6 is a cross-sectional view showing how fastening is achieved.

The bottom portions, respectively, of the control unit 81, the upper batteries 27, the contactor 86 and the battery managing unit 84 stored in the accessory box 30 are fixed to the accessory box 30. In addition, as shown in FIG. 6, a flange portion 87 is provided to each case-side wall portion of each of the control unit 81, the upper batteries 27, the contactor 86 and the battery managing unit 84. Thus, the control unit 81, the upper batteries 27, the contactor 86 and the battery managing unit 84 are attached to the accessory box 30 with their flange portions 87 interposed between the box main body 34 and the lid 35 by the corresponding bolts 36 with the assistance of retainers 88 as well.

Figure 7:
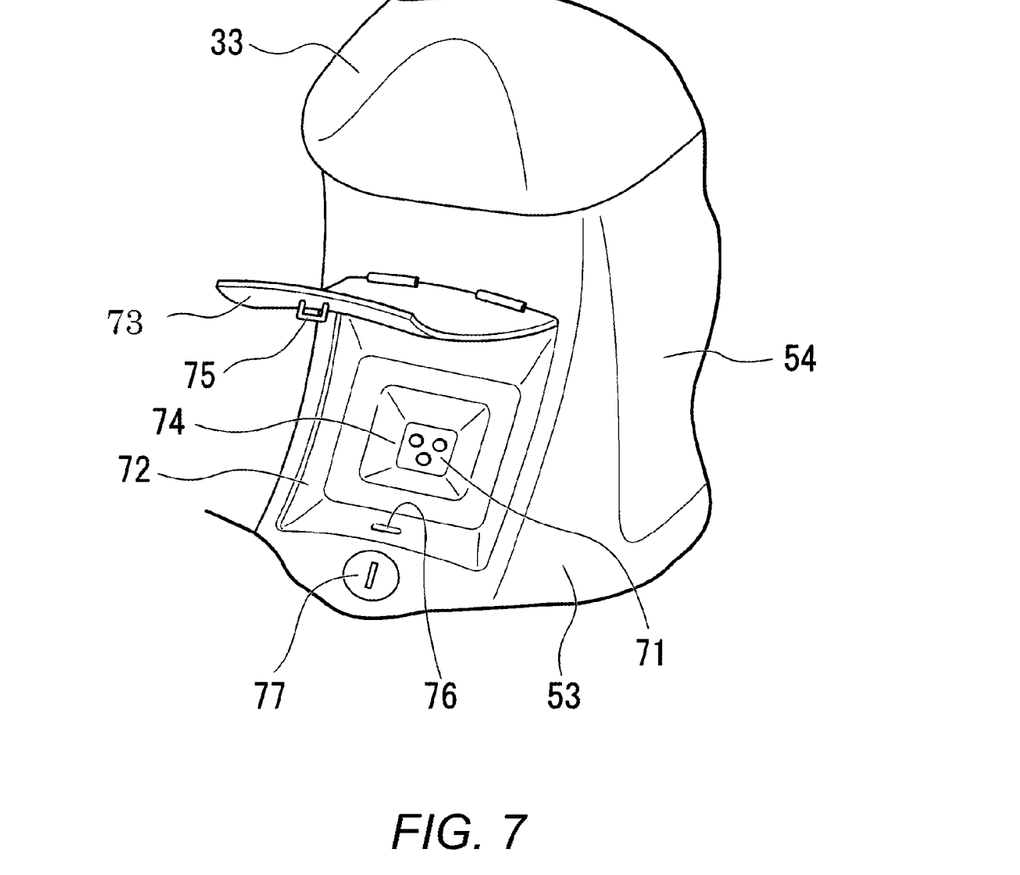
FIG. 7 is a perspective view of a charger connector and its vicinity.

As shown in FIG. 7, the inner cover 53 is provided with a connector storage portion 72 for the purpose of storing the charger connector 71. A connector lid 73, whose upper edge portion is supported by the connector storage portion 72, is attached to the connector storage portion 72 in a way that makes the connector lid 73 capable of opening and closing. The charger connector 71 in which to insert a charger plug of an external facility is placed in a bottom wall 74 of the connector storage portion 72.

An engagement portion 75 shaped like the letter U is provided to the connector lid 73, and is designed to be locked to a corresponding lock hole 76 in the connector storage portion 72. When a lock device 77 is rotationally manipulated by use of a key, which is not illustrated, with the connector lid 73 closed, the engagement portion 75 is locked to the lock hole 76, and the connector lid 73 is accordingly locked.

Figure 8:
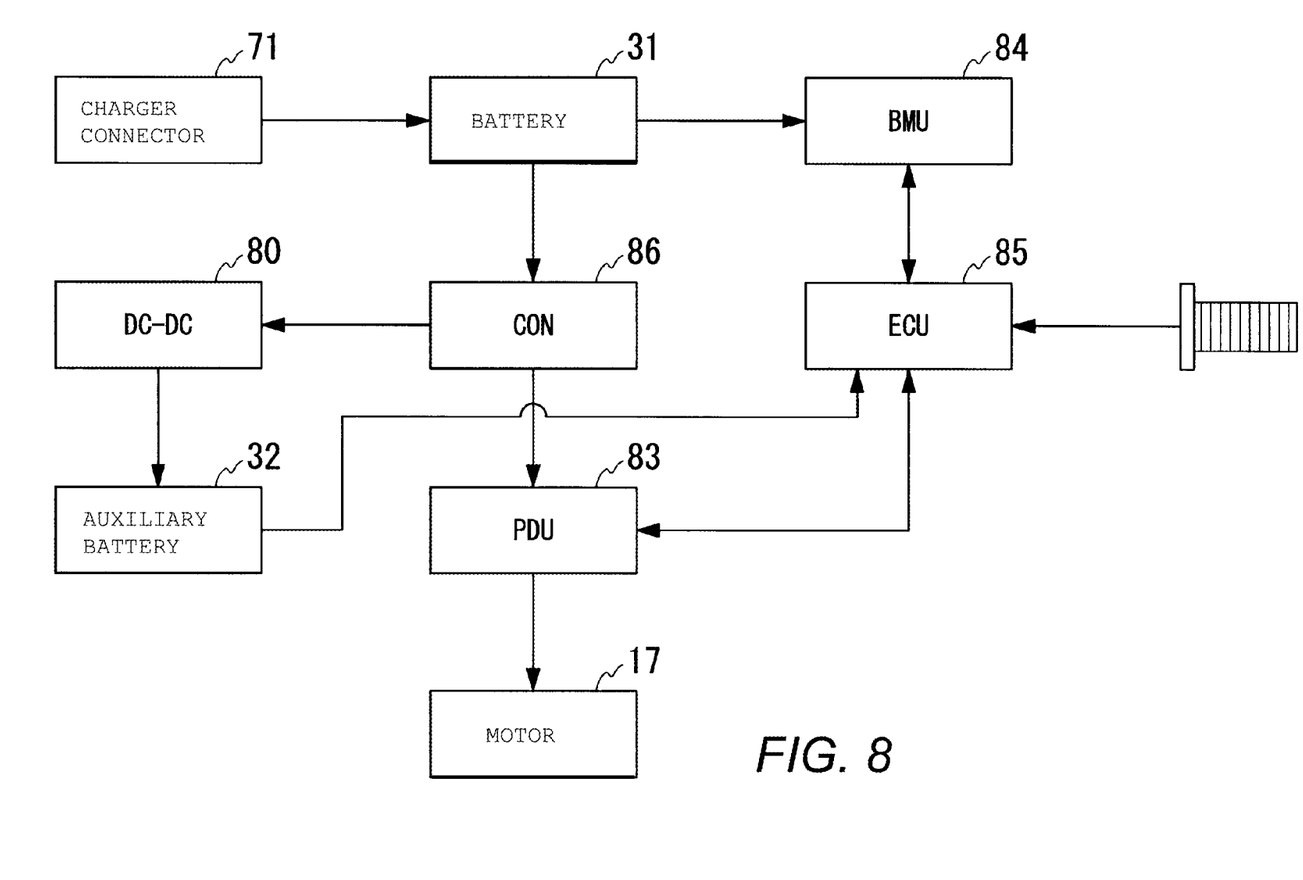
FIG. 8 is a block diagram showing electrical apparatuses.

FIG. 8 is a block diagram showing the electrical apparatuses. An electric power from the battery 31 is supplied to the power drive unit 83 via the contactor 86 linked to a main switch, which is not illustrated. After converted from a direct current to a three-phase alternating current by the power drive unit 83, the electric power is supplied to the motor 17, which is the three-phase AC motor. In addition, the voltage outputted from the battery 31 is lowered by the DC-DC converter 80, and is supplied to the auxiliary battery 32.

The charge and discharge conditions, temperature and the like of the battery 31 are monitored by the battery managing unit 84. Information on the charge and discharge conditions, temperature and the like of the battery 31 is shared between the battery managing unit 84 and the ECU 85. In addition to the accelerator opening signal, pieces of signal information from the respective various sensors are inputted into the ECU 85. On the basis of these pieces of signal information, the ECU 85 controls the drive of the motor 17 via the power drive unit 83. The electric power is supplied to the battery 31 from an external power supply apparatus via the charger connector 71.

The embodiment makes it possible to secure a larger capacity of the battery 31 and to place the battery 31 centrally, because the accessory box 30 in which the battery 31 for a travel drive and the accessories are stored is placed in the space portion between the seat 33 and the vehicle body frame 2 which would otherwise constitute a dead space. Accordingly, the embodiment makes it possible to build the vehicle body in a more compact than a vehicle body in which the battery is placed dispersedly. Furthermore, the manipulation of the accessory box 30 from the outside is restricted by the seat 33 covering and fixedly attached to the upper portion of the accessory box 30, except for during a maintenance service in which the accessory box 30 is manipulated with the seat 33 detached. For this reason, the accessories are made unable to be manipulated during the usual use.

The embodiment makes it possible to build the vehicle body in a compact size, and to protect the battery 31 and the accessories by placing the battery 31 and the accessories in the area which is interposed between the seat frames 7, 7 and accordingly makes it hard to manipulate the battery 31 and the accessories from the outside, because the battery 31 and the accessories are placed in the area between the seat frames which would otherwise constitute a dead space.

The embodiment makes it possible to secure the capacity of the battery 31, because the battery 31 can be placed in accordance with the shape of the otherwise dead space in which the left and right seat frames 7, 7 are spaced out progressively wider. This embodiment makes it possible to reduce the wiring length when the charger connector 71 is provided to the inner cover 53, and makes it easier to install the charger connector 71. Furthermore, the embodiment makes it possible to place the battery 31, which is placed in the front portion of the accessory box 30, closer to the center of the vehicle body, and to achieve the centralization of the battery 31.

Because the front lateral surfaces of the accessory box 30 in which the battery 31 is stored are covered with the seat frames 7, the rear sub-frames 8 and the reinforcement frames 62, the front lateral surfaces of the accessory box 30 can be protected from an external force by the seat frames 7, the rear sub-frames 8 and the reinforcement frames 62.

Moreover, the attachment portions between the accessory box 30 and the vehicle body frame 2, specifically, the front attachment seat 65 of the main frame 5, the intermediate attachment seats 66 of the seat frames 7 and the lower attachment seats 68 of the rear sub-frames 8 are provided in their respective locations which overlap the seat frames 7 or the rear sub-frames 8 when viewed in the side view. Accordingly, it is possible to prevent an external force, which acts from any lateral side during a lateral collision, from directly acting on the front attachment seat 65, the intermediate attachment seats 66 and the lower attachment seats 68. In addition, the storage box 20 having a larger volume space is placed under the main frame 5, thereby, enhancing the convenience.

Figure 9:
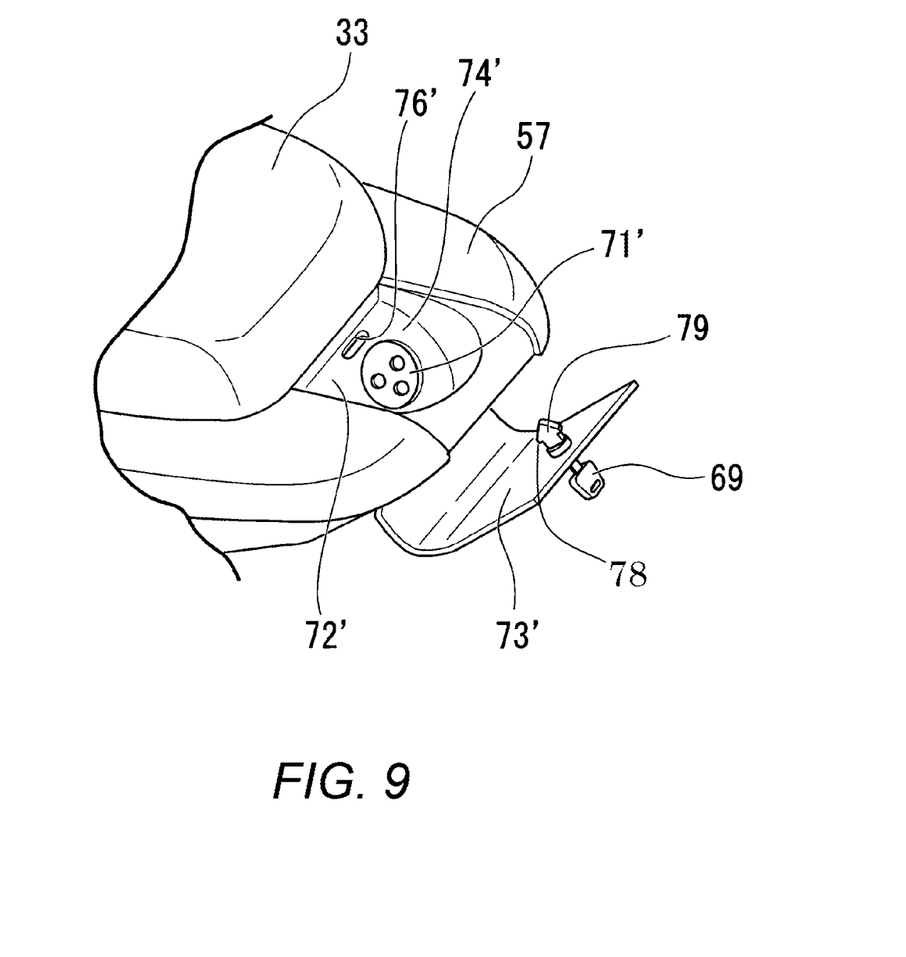
FIG. 9 is a perspective view of another embodiment.

Next, descriptions will be provided for a second embodiment of the present invention on the basis of FIG. 9. Incidentally, embodiment parts which are the same as those shown in FIG. 7 will be described with the embodiment parts denoted by the same reference numerals, to which an apostrophe is added. In this embodiment, the location of a charger connector 71' is set up in a tail cover 57. The tail cover 57 is provided with a connector storage portion 72' for the purpose of storing the charger connector 71'. The remaining parts are the same as those of the first embodiment. For this reason, descriptions for the remaining parts will be omitted.

A connector lid 73' whose rear lower end is supported by the connector storage portion 72' is attached to the connector storage portion 72' in a way that makes the connector lid 73' capable of opening and closing. A charger connector 71' in which to insert the charger plug of an external facility is placed in a bottom wall 74' of the connector storage portion 72'. The connector lid 73' is provided with a lock key 79, and the lock key 79 is designed to be locked to a corresponding lock hole 76' of the connector storage portion 72'. When the lock key 79 is rotationally manipulated by use of a key 69 with the connector lid 73' closed, a lock portion 78 of the lock key 79 is locked to the lock hole 76', and the connector lid 73' is locked accordingly.

This embodiment has the same effects as does the first embodiment, and additionally has an advantage that the charger connector 71' placed in the rear portion of the vehicle body is easier to use when used in a commercial facility which is designed to charge multiple electric vehicles by use of multiple arrayed charging apparatuses while the multiple electric vehicles are arranged in a row.

It should be noted that: the present invention is not limited to the foregoing embodiments; and the present invention can be applied to an electric four-wheeled vehicle as well, for example. In addition, the battery 31 is not limited to the lithium-ion battery. Any rechargeable secondary battery, such as a nickel hydrogen battery or a lead battery, may be used as the battery 31.

Moreover, although the foregoing descriptions have been provided for the case where the electric vehicle is charged by use of the external charging apparatus by providing the charger connector 71 to the electric vehicle, a mode of charging the electric vehicle by use of a household power supply can be used. In this case, a 100-volt plug together with a cable may be stored in the connector storage portions 72, 72'. It should be noted that, if the 100-volt plug is used, an inverter is provided inside the accessory box 30. Furthermore, various cooling structures for doing things such as introducing the cooling air by providing a fan in the rear portion of the accessory box 30 and an air introduction port in the front portion of the accessory box 30 may be adopted to cool the battery 31 and the electrical apparatuses.

An embodiment of the present invention provides an electric vehicle, in which a vehicle body frame (2) includes: a head pipe (4); a main frame (5) connected to the head pipe (4), and extending rearward downward; and a seat frame (7) attached to a rear portion of the main frame (5), and extending rearward upward, a seat (33) is fixed to an upper portion of the seat frame (7), a motor (17) for a travel drive is connected to a driving wheel (WR), and the electric vehicle includes: a battery (31) as a source of a travel driving force for the motor (17); and accessories (32, 80, 83, 85, 86, 84) provided for the motor (17) to be driven by the battery (31), the electric vehicle comprising an accessory box (30) for storing the battery (31) and the accessories (32, 80, 83, 85, 86, 84), wherein the accessory box (30) is placed in a space portion above a rear end of the main frame (5) and under the seat (33).

This embodiment makes it possible to secure a larger battery capacity and to place the battery centrally, because the accessory box in which the battery for a travel drive and the accessories are stored is placed in the space portion between the seat and the vehicle body frame which would otherwise constitute a dead space. Accordingly, the invention makes it possible to build the vehicle body in a more compact than a vehicle body in which the battery is placed dispersedly. Furthermore, the invention makes it possible to protect the accessory box by restricting the manipulation of the accessory box from the outside when the seat covers and is fixedly attached to the upper portion of the accessory box.

An embodiment of the present invention provides the electric vehicle, wherein a pair of the seat frames (7) are provided respectively in the left and right, and the left and right seat frames make a pair, the seat frames (7) are spaced out progressively wider toward the rear from portions of the seat frames (7) which are fixed to the main frame (5) when viewed in a plan view, and after that, rear end portions of the respective seat frames (7) are connected together by a cross plate (59) provided in a vehicle widthwise direction, and the accessory box (30) is placed inside a space interposed between the left and right seat frames (7, 7).

This embodiment makes it possible to build the vehicle body in a compact size, and to protect the battery and the accessories by placing the battery and the accessories in the area which is interposed between the seat frames and accordingly makes it hard to manipulate the battery and the accessories from the outside, because the battery and the accessories are placed in the area between the seat frames which would otherwise constitute a dead space.

An embodiment of the present invention provides the electric vehicle wherein the battery (31) is placed in a front portion of an inside of the accessory box (30), and the battery (31) is arranged in a way that makes an upper tier of the battery (31) wider in the vehicle widthwise direction than an lower tier of the battery (31) when viewed in a front view.

This embodiment makes it possible to secure the battery capacity, because the battery can be placed in accordance with the shape of the otherwise dead space in which the left and right seat frames are spaced out progressively wider. In addition, the invention makes it easy to provide a charging inlet in a front location under the seat, because the battery is placed in the front portion of the accessory box. Furthermore, the invention makes it possible to place the battery centrally, because the battery can be placed closer to the center of the vehicle body.

An embodiment of the present invention provides the electric vehicle wherein a pair of left and right rear sub-frames (8, 8) are attached to the rear end of the main frame (5), the rear sub-frames (8) are connected to the respective seat frames (7), the rear sub-frames (8) and the seat frames (7) are connected together by reinforcement frames (62), respectively, and front lateral surfaces of the accessory box (30) are covered with the seat frames (7), the rear sub-frames (8) and the reinforcement frames (62), respectively.

This embodiment makes it possible to protect the front lateral sides of the accessory box from an external force.

An embodiment of the present invention provides the electric vehicle wherein portions of the accessory box (30) which are attached to the vehicle body frame (2) are provided in locations which overlap the seat frames (7) and the rear sub-frames (8) when viewed in a side view.

This embodiment makes it possible to protect the front lateral sides of the accessory box, where the accessory box is attached to the vehicle body frame, from the external force.

An embodiment of the present invention provides the electric vehicle of any one of claims 1 to 5, wherein a storage box (20) is provided under the main frame (5).

This embodiment makes it possible to provide the storage portion having a larger volume space in the area under the main frame in which an engine would be placed in an engine vehicle, and accordingly to enhance the convenience.

Obviously, numerous modifications and variations of the present invention are possible in light of the above teachings.

It is therefore to be understood that within the scope of the appended claims, the invention may be practiced otherwise than as specifically described herein.

What is claimed is:

1. An electric vehicle comprising:
a vehicle body frame comprising:
a head pipe;
a main frame connected to the head pipe and extending rearward downward from the head pipe; and
a first seat frame attached to the main frame and extending rearward upward from the main frame;
a seat fixed to an upper portion of the first seat frame;
a driving wheel rotatable relative to the vehicle body frame;
a motor connected to the driving wheel to rotate the driving wheel;
a battery configured to supply power to the motor;
an accessory configured to assist at least one of the motor and the battery;
an accessory box storing the battery and the accessory, the accessory box being provided above a rear end of the main frame and under the seat; and
a storage box provided under the main frame,
wherein the accessory box is provided at a location above the storage box.

2. The electric vehicle of claim 1, wherein
the vehicle body frame further comprises a second seat frame attached to the main frame and extending rearward upward from the main frame,
the seat is fixed to an upper portion of the second seat frame,
the first and second seat frames are spaced from each other in a vehicle widthwise direction of the electric vehicle,
at least part of a space between the first and second seat frames progressively increases toward a rear of the electric vehicle when viewed from a vertical direction of the electric vehicle,
the vehicle body frame further comprises a cross plate connecting a rear end portion of the first seat frame to a rear end portion of the second seat frame, the cross plate extending in the vehicle widthwise direction, and
the accessory box is provided between the first and second seat frames.

3. The electric vehicle of claim 1, wherein
the battery is disposed in a front portion of an inside of the accessory box,
the battery includes a first battery portion and a second battery portion disposed under the first battery portion, and
the first battery portion is wider than the second battery portion in a vehicle widthwise direction of the electric vehicle.

4. The electric vehicle of claim 3, wherein
the vehicle body frame further comprises a second seat frame attached to the main frame and extending rearward upward from the main frame,
the seat is fixed to an upper portion of the second seat frame, and
the second battery portion is disposed between the first and second seat frames.

5. The electric vehicle of claim 4, wherein
the accessory box comprises:
a first portion storing the first battery portion; and
a second portion storing the second battery portion, and
the first portion is wider than the second portion in the vehicle widthwise direction.

6. The electric vehicle of claim 5, wherein
the second portion is disposed between the first and second seat frames.

7. The electric vehicle of claim 3, wherein
the accessory comprise an auxiliary battery disposed on a first lateral side of the second battery portion.

8. The electric vehicle of claim 7, wherein
the accessory further comprise a DC-DC converter configured to charge the auxiliary battery by lowering a voltage of the battery, and
the DC-DC converter is disposed on a second lateral side of the second battery portion.

9. The electric vehicle of claim 1, wherein
the vehicle body frame further comprises:
a second seat frame attached to the main frame and extending rearward upward from the main frame, an upper portion of the second seat frame being fixed to the seat;
a first rear sub-frame attached to the rear end of the main frame;
a second rear sub-frame attached to the rear end of the main frame;
a first reinforcement frame connecting the first rear sub-frame to the first seat frame; and
a second reinforcement frame connecting the second rear sub-frame to the second seat frame,
the seat is fixed to an upper portion of the second seat frame, and
the accessory box is disposed between the first and second seat frames, between the first and second rear sub-frames, and between the first and second reinforcement frames.

10. The electric vehicle of claim 1, wherein
the vehicle body frame further comprises:
a second seat frame attached to the main frame and extending rearward upward from the main frame;
a first rear sub-frame attached to the rear end of the main frame; and
a second rear sub-frame attached to the rear end of the main frame,
the seat is fixed to an upper portion of the second seat frame, and
portions of the accessory box attached to the vehicle body frame overlap the first and second seat frames and the first and second rear sub-frames when viewed from a vehicle widthwise direction of the electric vehicle.

11. The electric vehicle of claim 1, wherein
the vehicle body frame further comprises:
a second seat frame attached to the main frame and extending rearward upward from the main frame;
a first rear sub-frame attached to the rear end of the main frame; and
a second rear sub-frame attached to the rear end of the main frame,
the seat is fixed to an upper portion of the second seat frame, and
the accessory box is attached to the first and second seat frames and the first and second rear sub-frames.

12. The electric vehicle according to claim 1, further comprising:
a charger connector to which a charger plug of an external facility is to be connected, the charger connector being provided on a rear side of the accessory box.

13. The electric vehicle according to claim 1, wherein the accessory box is provided at a location such that an entirety of the accessory box is above the storage box.

* * * * *